(12) United States Patent
Gill et al.

(10) Patent No.: US 7,366,424 B2
(45) Date of Patent: *Apr. 29, 2008

(54) METHODS AND APPARATUS FOR PRODUCING TRANSMISSION FAILURE PROTECTED, BRIDGED, AND DISPERSION RESISTANT SIGNALS

(75) Inventors: Douglas M. Gill, South Orange, NJ (US); Steven K. Korotky, Toms River, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 757 days.

This patent is subject to a terminal disclaimer.

(21) Appl. No.: 10/644,235

(22) Filed: Aug. 20, 2003

(65) Prior Publication Data

US 2005/0041981 A1    Feb. 24, 2005

(51) Int. Cl.
  H04B 10/04    (2006.01)
  H04B 10/12    (2006.01)

(52) U.S. Cl. .................. 398/185; 398/193; 398/186; 398/188; 398/159

(58) Field of Classification Search ............... 398/183, 398/185, 186, 188, 189, 147, 149, 150, 159, 398/193

See application file for complete search history.

(56) References Cited

U.S. PATENT DOCUMENTS

| | | | | |
|---|---|---|---|---|
| 4,878,726 | A * | 11/1989 | Fatehi | 385/16 |
| 5,123,065 | A | 6/1992 | Enochs | |
| 6,388,786 | B1 * | 5/2002 | Ono et al. | 398/183 |
| 6,535,316 | B1 * | 3/2003 | Mizuhara | 398/183 |
| 6,542,276 | B1 | 4/2003 | Laroia et al. | |
| 2004/0202481 | A1 * | 10/2004 | Kariquist | 398/155 |

OTHER PUBLICATIONS

U.S. Appl. No. 10/245,029, filed Sep. 17, 2002, Korotky et al.

Fiber Optic Components: External Modulators, http://www.fiber-optics.info/articles/external-mod.htm, Publisher: Force, Incorporated, accessed Apr. 22, 2003.

Kloeppel, All-Optical Frequency Shifter is Fast and Accurated http://www.news.uluc.edu/scitips/03/0311frequency.html, Mar. 11, 2003, Publisher: News Bureau, University of Illinois at Urbana-Champaign.

(Continued)

*Primary Examiner*—Jason Chan
*Assistant Examiner*—Nathan Curs

(57) ABSTRACT

Apparatus for creating a communication signal, comprising a modulator adapted to: modulate a first and a second beam of continuous wave electromagnetic radiation with a source signal, assemble modulated portions of the first and second beams into a first electromagnetic radiation signal of interposed regular and alternate data bit sequences comprising asserted non return to zero coded data bits, each of the data bit sequences being interposed by unasserted data bits, in which mutually adjacent asserted data bits are conjoined, and assemble modulated portions of the first and second beams into a second electromagnetic radiation signal of interposed regular and alternate data bar bit sequences comprising asserted non return to zero coded data bar bits representing the unasserted data bits, each of the data bar bit sequences being interposed by unasserted data bar bits representing the asserted data bits, in which mutually adjacent asserted data bar bits are conjoined. Such apparatus for creating a communication signal, further comprising means for modulating the first electromagnetic radiation signal with the source signal to shift the phase of the alternate data bit sequences; and means for modulating the second electromagnetic radiation signal with the source signal to shift the phase of the alternate data bar bit sequences. Methods for creating communication signals.

24 Claims, 8 Drawing Sheets

OTHER PUBLICATIONS

Lee et al., Demonstration of a Photonically Controlled RF Phase Shifter, IEEE Microwave and Guided Wave Letters, Sep. 1999, pp. 357-359, vol. 9, No. 9.

Modulator Technology, http://www.pacificwaveind.com/html/f-pwc_modulator.htm, Publisher: Pacific Wave Communications, accessed Apr. 23, 2003.

Phase Shifter Technology, http://www.pacificwaveind.com/html/f-pwc_phase.htm, Publisher: Pacific Wave Communications, accessed Apr. 23, 2003.

Sanger, How Fiber Optics Works, The Industrial Physicist, Feb./Mar. 2002, pp. 18-21.

Song, DWDM and the Future Integrated Services Networks, IEEE Canadian Review, Spring 2000, pp. 5-7.

Stark et al., Line Coding for Dispersion Tolerance and Spectral Efficiency: Duobinary and Beyond. Optical Fiber Communication Conference, International Conference on Integrated Optics and Optical Fiber Communications, OFC/IOOC, Technical Digest, 1999, pp. 331-333, vol. 2.

Using the Lithium Niobate Modulator: Electro-Optical and Mechanical Connections, Technical Note, Apr. 1998, pp. 1-12, Publisher: Lucent Technologies Microelectronics Group.

Wooten et al., A Review of Lithium Niobate Modulators for Fiber-Optic Communications Systems, IEEE Journal of Selected Topics in Quantum Electronics, Jan./Feb. 2000, pp. 69-82, vol. 6, No. 1.

* cited by examiner

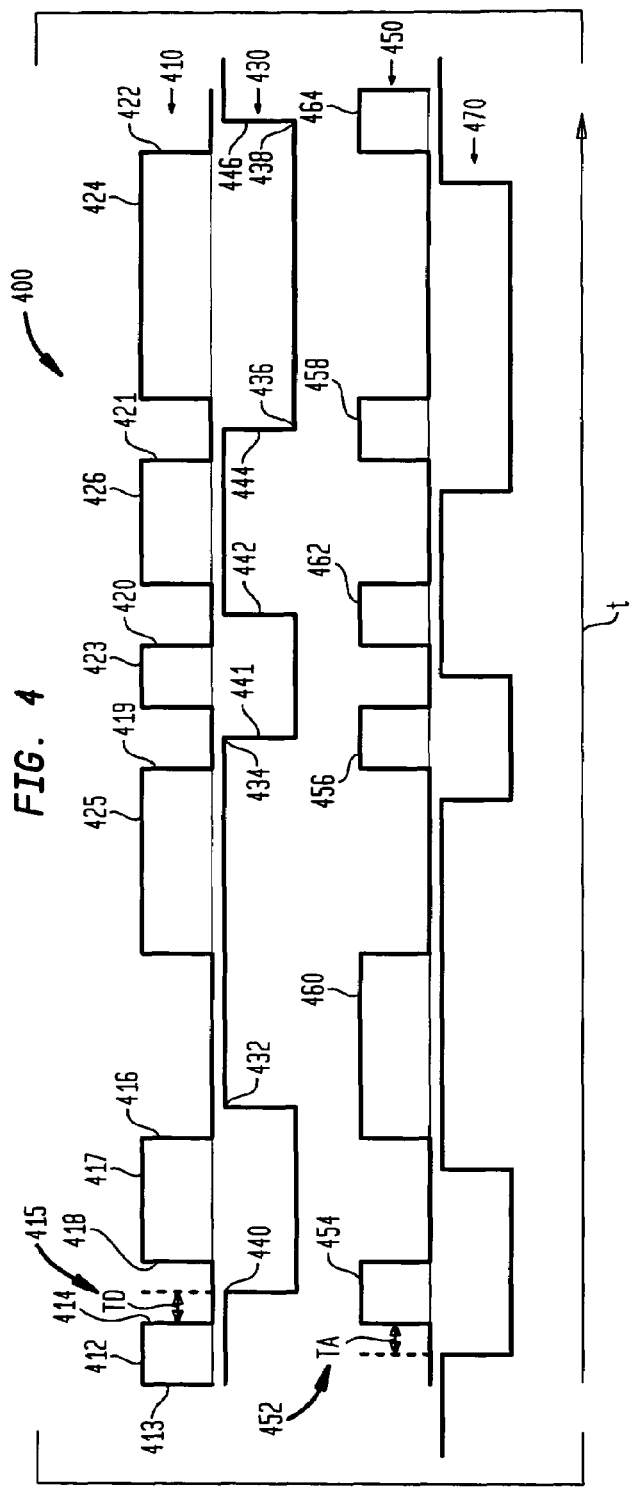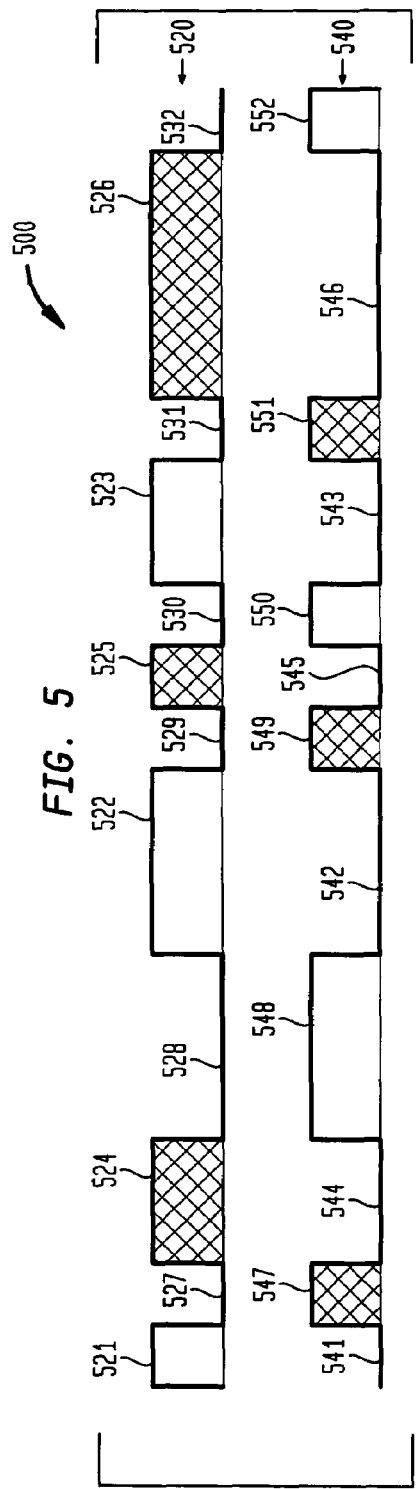

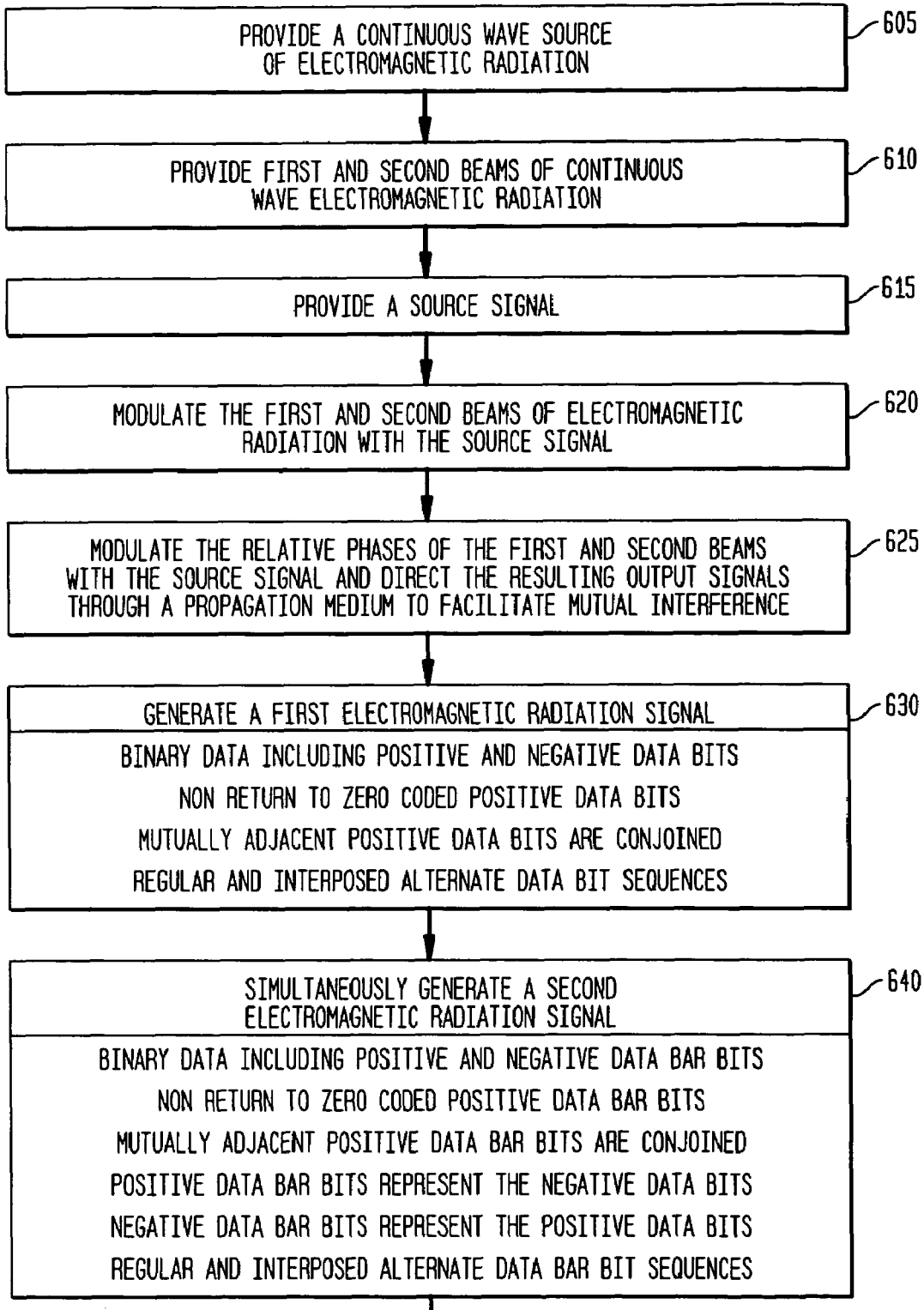

METHODS AND APPARATUS FOR PRODUCING TRANSMISSION FAILURE PROTECTED, BRIDGED, AND DISPERSION RESISTANT SIGNALS

FIELD OF THE INVENTION

The present invention relates to advantageous methods and apparatus for providing electromagnetic radiation signals that are protected against a signal transmission failure, that are bridged, and that are resistant to chromatic dispersion.

BACKGROUND OF THE INVENTION

Optical telecommunication systems require that a given signal be efficiently transmitted from an origination point to an intended termination point, while maintaining a signal quality that is suitable for use of the signal upon its delivery. The ever present drive for lower costs, higher bandwidth, and faster service creates challenges to the maintenance of acceptable signal quality. Meanwhile, signal quality demands also simultaneously evolve, creating increased system performance requirements that often are in conflict with the drive for lower costs.

One of the many prevalent signal quality issues concerns signal failure protection. A signal transmitted over a particular path is vulnerable to failure of the equipment supporting the path. To address this vulnerability, a copy of the signal can be provided for transmission by a different path. Although failure protection by providing such signal copies is broadly desirable, there are costs associated with implementation of such protection. For example, splitting of the original signal into two separate signals typically requires either the use of additional resources to generate and provide energy to carry the second signal, or acceptance of the attenuation resulting from direct signal splitting.

Another signal quality issue concerns chromatic dispersion. A typical signal is transmitted within a narrow band of wavelengths brackets a desired center wavelength, which wavelengths nevertheless travel at slightly different speeds. On an extended signal transmission path, these different speeds cause a given signal pulse to spread out in time. This pulse spreading, also referred to as chromatic dispersion, can result in partial overlapping of adjacent pulses within the signal. Herein, a bit signified by the presence of pulse energy is said to be "asserted," whereas a bit signified by the absence of pulse energy is said to be "unasserted." Although an asserted bit is often interpreted as having the value "one" and an unasserted bit as having the value "zero," other interpretations are also possible. If constructive interference occurs in the overlap region between adjacent pulses, a portion of the original signal intended to register as a zero or unasserted data bit, can be distorted to incorrectly register as a one or an asserted data bit.

There is thus a need for apparatus capable of generating improved telecommunication signals that are provided with failure protection as well as resistance to chromatic dispersion, and a need for methods capable of generating, transmitting and receiving such signals.

In particular, such apparatus and methods are needed in the context of non return to zero (NRZ) coding, in which mutually adjacent asserted data bits are "conjoined;" that is, the pulse energy does not return to zero between such bits, but instead, those bits are directly joined together into a unitary asserted data bit sequence having a length equivalent to the cumulative data bit lengths that are so joined together.

SUMMARY OF THE INVENTION

In one embodiment according to the present invention, an apparatus for creating a communication signal is provided, comprising a modulator adapted to: modulate a first and a second beam of continuous wave electromagnetic radiation with a source signal, assemble modulated portions of said first and second beams into a first electromagnetic radiation signal of interposed regular and alternate data bit sequences comprising asserted non return to zero coded data bits, each of said data bit sequences being interposed by unasserted data bits, in which mutually adjacent asserted data bits are conjoined, and assemble modulated portions of said first and second beams into a second electromagnetic radiation signal of interposed regular and alternate data bar bit sequences comprising asserted non return to zero coded data bar bits representing said unasserted data bits, each of said data bar bit sequences being interposed by unasserted data bar bits representing said asserted data bits, in which mutually adjacent asserted data bar bits are conjoined.

In this regard, "regular" and "alternate" data bit sequences and data bar bit sequences are distinguished from each other by a relative difference in phase, as will be explained in detail below.

In another embodiment according to the present invention, such an apparatus for creating a communication signal is provided, further comprising: means for modulating said first electromagnetic radiation signal with said source signal to shift the phase of said alternate data bit sequences; and means for modulating said second electromagnetic radiation signal with said source signal to shift the phase of said alternate data bar bit sequences.

In a further embodiment according to the present invention, a method of creating a communication signal is provided, comprising the steps of modulating a first and a second beam of continuous wave electromagnetic radiation with a source signal, generating a first electromagnetic radiation signal of interposed regular and alternate data bit sequences comprising asserted non return to zero coded data bits, each of said data bit sequences being interposed by unasserted data bits, in which mutually adjacent asserted data bits are conjoined, and generating a second electromagnetic radiation signal of interposed regular and alternate data bar bit sequences comprising asserted non return to zero coded data bar bits representing said unasserted data bits, each of said data bar bit sequences being interposed by unasserted data bar bits representing said asserted data bits, in which mutually adjacent asserted data bar bits are conjoined.

In an additional embodiment according to the present invention, such a method of creating a communication signal is provided, comprising the further steps of modulating said first electromagnetic radiation signal with said source signal to shift the phase of said alternate data bit sequences; and modulating said second electromagnetic radiation signal with said source signal to shift the phase of said alternate data bar bit sequences.

A more complete understanding of the present invention, as well as further features and advantages of the invention, will be apparent from the following detailed description and the accompanying drawings.

BRIEF DESCRIPTION OF THE DRAWINGS

FIG. 4 shows encoded representations of a modified source signal during subsequent processing by the apparatus shown in FIG. 1 in accordance with the present invention;

FIG. 5 shows an encoded chromatic dispersion resistant signal, protected against a signal transmission failure, having been processed by the apparatus shown in FIG. 1 in accordance with the present invention;

FIGS. 6A and 6B show an exemplary method according to the present invention that can be executed by the apparatus shown in FIG. 1, for producing failure protected alternate block phase inversion coded representations of a source signal;

DETAILED DESCRIPTION

The present invention will now be described more fully with reference to the accompanying drawings, in which several presently preferred embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
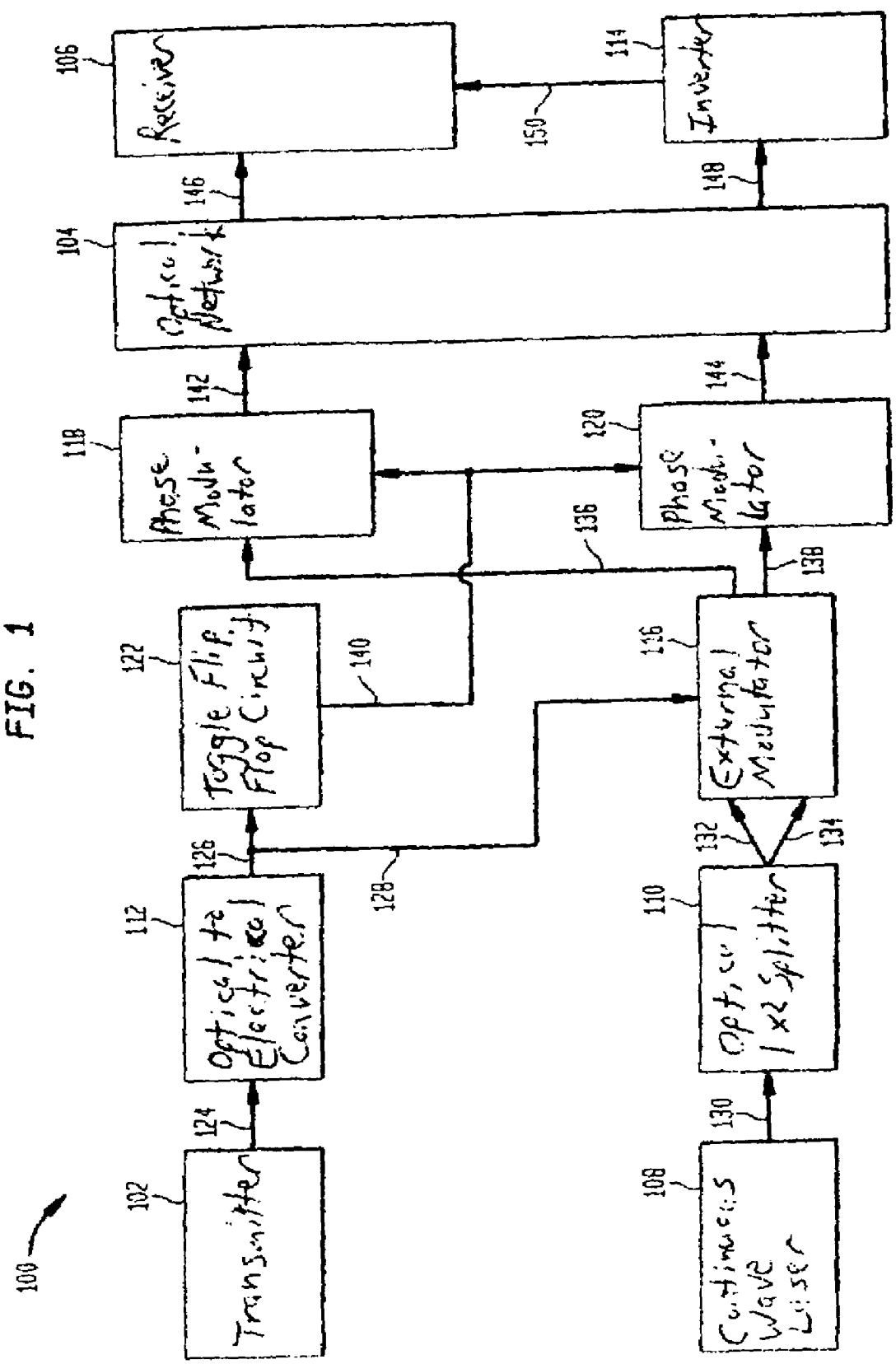
FIG. 1 shows an exemplary embodiment of an apparatus in accordance with the present invention for producing a chromatic dispersion resistant electromagnetic radiation signal protected against a signal transmission failure.

FIG. 1 shows an exemplary embodiment of a suitable apparatus 100 that can be used to produce a chromatic dispersion resistant electromagnetic radiation signal protected against a signal transmission failure in accordance with the present invention. The apparatus 100 includes a transmitter 102, an optical network 104, and a receiver 106. The apparatus further includes a continuous wave laser 108, an optical 1×2 splitter 110, an optical to electrical converter 112, and an inverter 114. The apparatus also includes an external modulator 116, phase modulators 118 and 120, and a toggle flip flop circuit 122.

The transmitter 102 transmits an optical source signal on waveguide 124 to optical to electrical converter 112. Optical to electrical converter 112 outputs an electrical signal on conductor 126 which is input into toggle flip flop circuit 122. Optical to electrical converter 112 also outputs an electrical signal on conductor 128 which is input into external modulator 116. Continuous wave laser 108 outputs a continuous optical wave on waveguide 130 to optical 1×2 splitter 110. Optical 1×2 splitter 110 outputs continuous optical waves on waveguides 132 and 134 that are input to external modulator 116. External modulator 116 outputs an optical signal, generated by modulation of the continuous wave received from waveguide 132, on waveguide 136 to phase modulator 118. External modulator 116 also outputs an optical signal, generated by modulation of the continuous wave received from waveguide 134, on waveguide 138 to phase modulator 120. Toggle flip flop circuit 122 outputs an electrical signal on conductor 140 which is input to phase modulators 118 and 120. Phase modulator 118 outputs an optical signal on waveguide 142 which is input into optical network 104. Phase modulator 120 outputs an optical signal on waveguide 144 which is also input into optical network 104. After passing through the optical network 104, the optical signal received from waveguide 142 is input on waveguide 146 to receiver 106. After passing through the optical network 104, the optical signal received from waveguide 144 is input on waveguide 148 to inverter 114, and then on waveguide 150 to receiver 106.

In operation of the apparatus 100, the transmitter 102 emits an optical source signal on waveguide 124 that needs to be transmitted to the receiver 106. The continuous wave laser 108 generates a continuous wave of electromagnetic radiation which is directed on waveguide 130 into optical 1×2 splitter 110. The output power of the continuous wave laser 108 is adjusted to compensate for the attenuation resulting from interposition of the optical splitter 110. Two identical continuous waves of electromagnetic radiation are emitted by optical splitter 110 on waveguides 132 and 134.

In one preferred embodiment according to the present invention, each of the continuous waves of electromagnetic radiation may have a center wavelength, for example, within a range between about 1525 nanometers (nm) and about 1610 nm. The optical signals transmitted through the optical network 104 will have the same center wavelength. However, optical signals having other center wavelengths can alternatively be employed. Further, electromagnetic radiation having a center wavelength outside the wavelength range of optical signals can also be employed.

The continuous waves of electromagnetic radiation on waveguides 132 and 134 are directed on separate paths into external modulator 116. External modulator 116 is capable of causing constructive and destructive interference between the two identical continuous waves of electromagnetic radiation input on waveguides 132 and 134. External modulator 116 further is capable of receiving an external electronic control signal which is then used to modulate the constructive and destructive interference between the two identical continuous waves of electromagnetic radiation input on waveguides 132 and 134. External modulator 116 may comprise, for example, a dual output intensity modulator. The optical source signal is directed on waveguide 124 into the optical to electrical converter 112, which converts the source signal from an optical form into an electrical form. The resulting electrical signal is then emitted from the optical to electrical converter 112 on conductor 126 and is directed on conductor 128 into the external modulator 116.

The electrical signal provided on conductor 128 is then used by the external modulator 116 to facilitate and control the constructive and destructive interference between the two identical continuous waves of electromagnetic radiation input on waveguides 132 and 134. Constructive interference of the electromagnetic wave input on waveguide 132 with the electromagnetic wave input on waveguide 134 results in propagation of an active signal, or asserted data bits, referred to as a data bit sequence signal on waveguide 136. Destructive interference between such waves of electromagnetic radiation results in an absence of propagation of asserted data bits on waveguide 136, which absence is referred to as unasserted data bits. The electrical signal on conductor 128 is also used by the external modulator 116 to control the constructive and destructive interference of the electromagnetic wave input on waveguide 134 with the electromagnetic wave input on waveguide 132, resulting in propagation of a series of asserted data bits, referred to as a data bar bit sequence signal, on waveguide 138 as modulated by the source signal from transmitter 102. Mutually adjacent asserted data bits are joined together without return of the signal to zero.

External modulator 116 is adapted so that the phase of the interference on waveguide 134 is inverted as compared with the interference applied on waveguide 132. Accordingly, whenever an asserted data bit is generated on waveguide 136, there is no signal generated on waveguide 138. Conversely, whenever there is no signal, or unasserted data bits, generated on waveguide 136, an asserted data bit is generated on waveguide 138. Hence, the signal generated on waveguide 138 is the inverse of the signal generated on waveguide 136, and the signal generated on waveguide 138 is accordingly referred to as a data bar bit sequence signal. At any given point in time, a data bit is generated on either waveguide 136 or on waveguide 138, but never simultaneously on both waveguides. External modulator 116 thus acts as an optical switch, generating a copy of the source signal on waveguide 136, and generating an inverted copy of the source signal on waveguide 138. The data bit sequence signal is then directed by waveguide 136 into phase modulator 118. The data bar bit sequence signal is then directed by waveguide 138 into phase modulator 120.

The electrical signal on conductor 126 is also used to control the phase modulators 118 and 120. The electrical signal on conductor 126 is directed into toggle flip flop circuit 122, which senses transitions in the source signal from asserted data bits to unasserted data bits. The toggle flip flop circuit 122 is adapted to emit either a relatively high voltage or a relatively low voltage. Whenever the toggle flip flop circuit 122 senses a transition in the source signal from asserted data bits to unasserted data bits, the toggle flip flop circuit 122 flips from its most recent voltage state. If such a transition occurs when the toggle flip flop circuit 122 is emitting high voltage, then toggle flip flop circuit 122 flips to emit low voltage. If such a transition occurs when the toggle flip flop circuit 122 is emitting low voltage, then toggle flip flop circuit 122 flips to emit high voltage. The voltage currently emitted by toggle flip flop circuit 122 is directed on conductor 140 to control the phase modulator 118 and the phase modulator 120. When high voltage is applied to phase modulator 118, data bit sequences within the data bit sequence signal remain in phase with the source signal. When low voltage is applied to phase modulator 118, data bit sequences within the data bit sequence signal are shifted to about 180° out of phase with the source signal. This phase shift is equivalent to about one half the center wavelength of the carrier signal. Since the voltage emitted by toggle flip flop circuit 122 changes with every transition in the source signal from asserted data bits to unasserted data bits, alternating data bit sequences within the data bit sequence signal on waveguide 136 are shifted by phase modulator 118 to about 180° out of phase with each other. As chromatic dispersion over a significant distance leads to pulse broadening and overlapping of adjacent data bit sequences, they destructively interfere due to this alternate phase shifting. Hence, so long as the overlap of adjacent data bit sequences is of a magnitude less than about ⅓ of an asserted data bit, pulse broadening interference does not result in undue corruption of the original data bit sequence signal. The data bit sequence signal is thus protected from chromatic dispersion.

At any given point in time, a data bit is generated on either waveguide 136 or on waveguide 138, but never simultaneously on both waveguides. Hence, asserted data bit signals on waveguides 136 and 138 also are mutually separated by a time period equal to one data bit. For example, a data bit sequence of "101010" on waveguide 136 will be reflected as an inverted data bar bit sequence of "010101" on waveguide 138. Accordingly, the electrical signal on conductor 140 can also be used to control phase modulator 120, provided that this one data bit differential is taken into account. In one embodiment according to the present invention, the voltage transitions in the toggle flip flop circuit 122 are applied to phase modulator 118 with a time advancement constituting about half of one data bit length, so that voltage changes are invoked before passage of the rising edge of the triggering data bit sequence. The time period occupied by transmission of one asserted data bit may be, for example, within a range between about 50 and 150 picoseconds, such as, for example, about 100 picoseconds. Accordingly, for example, the voltage transitions can be advanced by a time period within a range between about 25 picoseconds and about 75 picoseconds, such as, for example, a time period of about 50 picoseconds. The voltage transitions in the toggle flip flop circuit 122 are then applied to phase modulator 120 with a time delay of a similar magnitude constituting about half of one data bit length, so that voltage changes are invoked before passage of the rising edge of the data bit sequence to be subjected to phase shifting. Since the signal on waveguide 136 is advanced by half of the time period occupied by a data bit and the signal on waveguide 138 is delayed by the same time period, the two control signals are mutually displaced by a difference of one data bit. For example, the voltage transitions applied to phase modulator 120 can be delayed relative to the voltage transitions applied to phase modulator 118 by a combined time period within a range between about 75 picoseconds and about 125 picoseconds, such as, for example, a time period of about 100 picoseconds.

Accordingly, the same toggle flip flop circuit 122 can be used to control both phase modulator 118 and phase modulator 120. When high voltage is applied to phase modulator 120, data bar bit sequences remain in phase with the source signal. When low voltage is applied to phase modulator 120, data bar bit sequences within the data bar bit sequence signal are shifted to be about 180° out of phase with the source signal.

Phase modulator 118 emits an alternate block phase inverted data bit signal on waveguide 142. The term "alternate block phase inversion" is meant to convey that alternating data bit sequences are in an inverted phase. Similarly, phase modulator 120 emits an alternate block phase inverted data bar bit signal on waveguide 144. The alternate block phase inverted data bit signal emitted on waveguide 142 embodies a copy of the source signal emitted by transmitter 102, in the form of data bit sequences. Mutually adjacent asserted data bits are not separated by any return of the signal to an unasserted or zero state. For example, two adjacent data bits are represented as a single composite pulse having a time length of two data bits. Mutually adjacent asserted data bit sequences, separated by an unasserted or zero data sequence having a length of at least one bit, are mutually out of phase by about 180°. If such mutually adjacent data bit sequences begin to overlap due to chromatic dispersion, destructive interference predominates their interaction. Therefore, a minimal amount of optical power is within the width of the unasserted data bit and the corruption of the original data signal that is typically associated with the effects of chromatic dispersion on such mutually adjacent data bit sequences is significantly reduced. The alternate block phase inverted data bar bit signal emitted on waveguide 144 is the inverse of the alternate block phase inverted data bit signal emitted on waveguide 142. Hence, the alternate block phase inverted data bar bit signal emitted on waveguide 144 effectively constitutes an inverted copy of the alternate block phase inverted data bit signal emitted on waveguide 142, providing protection against a failure in the delivery of either of the two signals.

The alternate block phase inverted data bit signal and the alternate block phase inverted data bar bit signal are then directed through optical network 104 to receiver 106. The signals can be directed on different paths through the optical network 104 in order to provide failure protection for the source signal. Optical network 104 redundantly connects a plurality of nodes in the network via wavelength paths, either in a ring, mesh, or other optical network topology, whereby the alternate block phase inverted data bar bit signal and the alternate block phase inverted data bit signal may separately reach a termination node either directly or via multiple hops through intermediate nodes.

The alternate block phase inverted data bit signal and alternate block phase inverted data bar bit signal are then processed by receiver 106. For example, such signals may be converted from an optical form into an electrical form by an optical to electrical converter. Since the alternate block phase inverted data bar bit signal is an inverted representation of the source signal, it can be processed by the inverter 114 to generate an alternate block phase inverted data bit signal.

In an alternative embodiment according to the present invention, the phase modulators 118 and 120 and toggle flip flop circuit 122 can be omitted. In such a case, waveguides 136 and 138 emit a non return to zero data bit sequence signal and a non return to zero data bar bit sequence signal, respectively. Since the data bar bit sequence signal is the inverse of the data bit sequence signal, the data bar bit sequence signal can be inverted to provide a copy of the data bit sequence signal. Thus, failure protection is provided. However, no protection against chromatic dispersion is afforded by this embodiment.

Background information regarding alternate block inversion coding of a non failure protected source signal is provided in the Laroia et al. U.S. Pat. No. 6,542,276, which is incorporated by reference herein in its entirety. Alternate block inversion coding of a source signal is referred to by Laroia et al. as BAMI coding and is discussed in particular at column 10, line 39 through column 11, line 33. Further background information regarding alternate block inversion coding of a non failure protected source signal is provided in Stark, Jason B. et al., "Line Coding for Dispersion Tolerance and Spectral Efficiency: Duobinary and Beyond", Optical Fiber Communication Conference, 1999, and in the International Conference on Integrated Optics and Optical Fiber Communication, OFC/IOOC, Technical Digest, Vol. 2, pp. 351-333, 1999, both of which are incorporated herein by reference in their entirety.

Figures 2, 3:
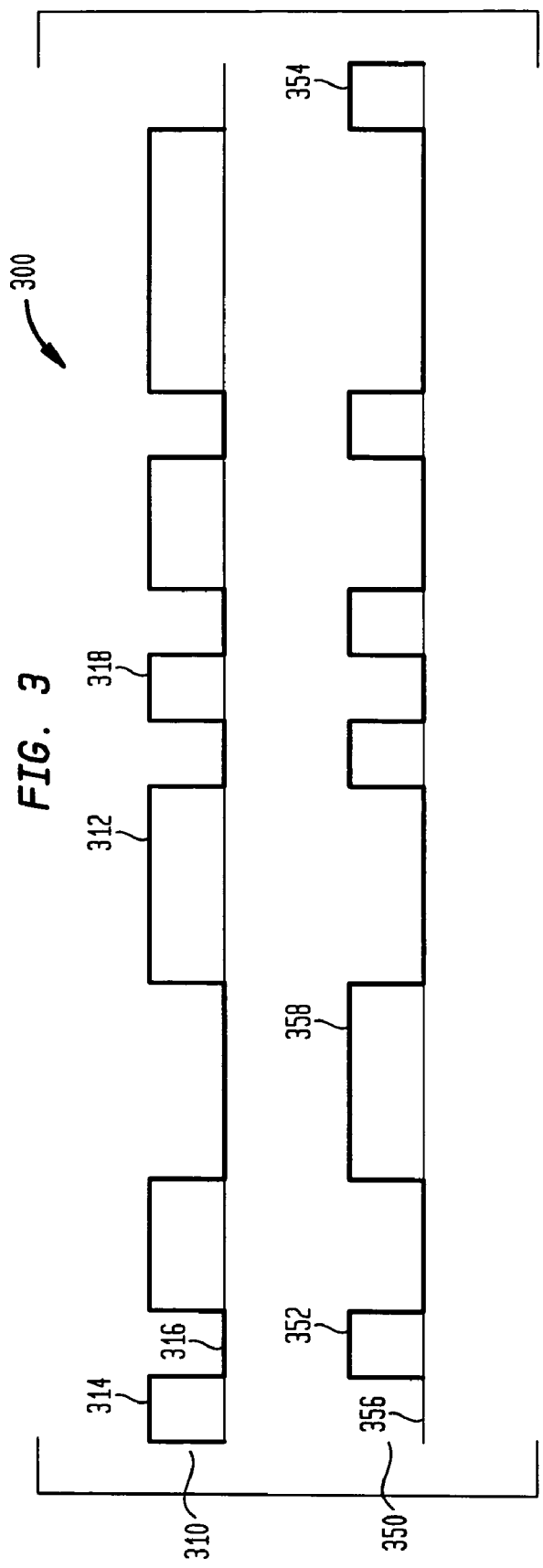
FIG. 2 shows a series of sample pulses from a source signal, to be processed by the apparatus shown in FIG. 1 in accordance with the present invention.
FIG. 3 shows encoded representations of a modified source signal which can be produced during initial processing by the apparatus shown in FIG. 1 in accordance with the present invention.

FIG. 2 shows a binary representation of a portion of a suitable source data stream 200 to be transmitted from transmitter 102 to receiver 106 shown in FIG. 1. In one aspect according to the present invention, transmitter 102 utilizes source data stream 200 to generate an optical signal that is transmitted along waveguide 124. A series of exemplary binary bits 205 within the source data stream 200 are shown, which include asserted data bits such as exemplary asserted data bits 210 and 215, and unasserted data bits such as exemplary unasserted data bits 220 and 225. The series of binary bits 205 includes both solitary asserted data bits such as exemplary asserted data bit 215, and mutually adjacent asserted data bits such as the three consecutive one bits collectively indicated at 230, for example. The series of binary bits 205 is suitable for processing by the exemplary apparatus 100 according to the present invention as shown in FIG. 1, in order to provide the source data stream 200 with resistance to chromatic dispersion and with protection against a signal transmission failure. The source data stream 200 is transmitted by transmitter 102 on waveguide 124 to optical to electrical converter 112. The resulting electrical signal is output on conductor 126 and input into toggle flip flop circuit 122. Conductor 126 also carries the electrical signal to conductor 128 which then inputs the electrical signal into external modulator 116. Accordingly, the source data stream 200 is used as a modulating control signal in external modulator 116 and toggle flip flop circuit 122.

FIG. 3 shows a failure protected pair 300 of encoded signal representations of the source data stream 200 shown in FIG. 2. Each of the asserted data bits in the source data stream 200 such as exemplary asserted data bit 210, is represented within the encoded representation 310 by electromagnetic radiation that is one bit length in duration. Each of the unasserted data bits in the source data stream 200 such as exemplary unasserted data bit 220, is represented within the encoded representation 310 by an absence of electromagnetic radiation that is one bit length in duration such as exemplary unasserted data bit 316. Encoded signal representation 310 is a representation of the series of binary bits 205 within source data stream 200, and the asserted data that the encoded representation 310 contains will be referred to as data bits. Encoded signal representation 350 is an inverted representation of the series of binary bits 205 within source data stream 200, and the asserted data that the encoded representation 350 contains will be referred to as data bar bits. FIG. 3 is shown together with FIG. 2 to make these relationships visually apparent. The encoded representation 310 includes data bit sequences comprising multiple asserted data bits, such as exemplary asserted data bit sequence 312. Data bit sequence 312 represents the same data as do the three consecutive binary one bits collectively indicated at 230 in FIG. 2. The three asserted data bits 312 within data bit sequence 310 are mutually adjacent without interposed unasserted data bits. The encoded representation 310 is accordingly referred to as being in non return to zero format, because there is no return of the signal to zero in between the mutually adjacent asserted data bits in asserted data bit sequence 312. Encoded representation 310 thus constitutes a non return to zero encoded data bit sequence signal representing source data stream 200. For example, asserted data bits 314 and 318 in FIG. 3 represent asserted data bits 210 and 215 in FIG. 2, respectively. Encoded representation 350 further constitutes a non return to zero encoded data bar bit sequence signal representing the inverse of the source data stream 200. For example, asserted data bar bits 352 and 354 in FIG. 3 represent unasserted data bits 220 and 225 in FIG. 2, respectively. Inversion of the inverted encoded representation 350 yields a copy of encoded representation 310. Hence, encoded representations 310 and 350 can facilitate failure protected transmission of source data stream 200, but do not provide protection from chromatic dispersion.

Encoded representations 310 and 350 can be simultaneously generated in an efficient manner according to the present invention. Referring to FIG. 1, conductor 126 carries the electrical signal representing source signal 205 to conductor 128 which then inputs the electrical signal into external modulator 116. As explained earlier, external modulator 116 generates constructive and destructive interference between the signals on waveguides 132 and 134, as modulated by the electrical signal representing source signal 205. This constructive and destructive interference results in propagation of a series of asserted data bits on waveguide 136 in the form of encoded signal representation 310. External modulator 116 is adapted so that the phase of the interference applied to the signal on waveguide 134 is inverted as compared with the interference applied to the signal on waveguide 132. Accordingly, the signal generated on waveguide 138 is the inverse of the signal generated on waveguide 136, and is in the form of encoded signal representation 350.

Encoded signal representation 310 is output on waveguide 136 shown in FIG. 1 and input to phase modulator 118. Encoded signal representation 350 is output on waveguide 138 shown in FIG. 1 and input to phase modulator 120. The electrical signal on conductor 126 is then used to enable the toggle flip flop circuit 122 to control the modulation of phase modulators 118 and 120. As a result, alternating data bit sequences within the data bit sequence signal on waveguide 136 and alternating data bar bit sequences within the data bar bit sequence signal on waveguide 138 are shifted 180° out of phase with each other.

FIG. 4 shows a failure protected pair 400 of encoded signal representations 410 and 450 of source data stream 200 during signal modulation by phase modulators 118 and 120 shown in FIG. 1. Encoded signal representation 410 is the same signal representation as is data bit signal representation 310 shown in FIG. 3. Encoded signal representation 450 is the same signal representation as is data bar bit signal representation 350 shown in FIG. 3. Time passes in the direction of the arrow t.

FIG. 4 further shows control signal waveform 430 aligned in time with encoded signal representation 410. Control signal waveform 430 schematically indicates the points at which the phase of encoded signal representation 410 is toggled between a normal position and an out of phase position by application of the control signal from the toggle flip flop circuit 122. A relatively high voltage within control signal waveform 430 is exemplified by the signal portion between control signal waveform points 432 and 434. A relatively low voltage within control signal waveform 430 is exemplified by the signal portion between control signal waveform points 436 and 438. When a relatively high voltage is applied to phase modulator 118, data bit sequences within data bit sequence signal 310 remain in phase with the source signal. When a relatively low voltage is applied to phase modulator 118, data bit sequences within data bit sequence signal 410 are shifted by a time period equivalent to about half of the center wavelength of data bit sequence signal 410, or about 180°, out of phase with the source signal. Exemplary data bit sequence 412 has both a rising edge 413 at which a transition from a nonasserted bit to an asserted bit occurs, and a subsequent falling edge 414 at which a transition from an asserted bit to a nonasserted bit occurs. Following passage of the falling edge 414 plus a time period of delay TD indicated at 415, control signal waveform 430 registers a phase change at point 440. The time period of delay, TD, preferably constitutes about one half of the center wavelength of the carrier signal. Accordingly, the time period of delay may be, for example, about 50 picoseconds. Following passage of the next falling edge 416 in data bit sequence 417 plus the same time period of delay TD, control signal waveform 430 registers another phase change at point 432. Phase changes 440 and 432 constitute a complete phase change cycle brackets data bit sequence 417, that begins prior to arrival of the rising edge 418 and ends after the arrival of falling edge 416. Hence, the portion of control signal waveform 430 spanning phase changes 440 and 432 can be used to control the phase modulator 118 in order to shift the data bit sequence 417 out of phase.

Encoded representation 410 includes four additional falling edges 419, 420, 421 and 422. Control signal waveform 430 includes the resulting needed phase changes 441, 442, 444 and 446. Phase changes 441 and 442 bracket and can be used to control phase shifting of data bit sequence 423. Phase changes 444 and 446 bracket and can be used to control phase shifting of data bit sequence 424. Asserted data bit sequences 412, 425 and 426 will be referred to as regular data bit sequences. The interposed asserted data bit sequences 417, 423 and 424 will be referred to as alternate data bit sequences for the sole purpose of making subsequent reference to their interposed positions relative to the regular data bit sequences. Following completion of the phase shifting as described, regular data bit sequences 412, 425 and 426 remain in normal phase, and alternate data bit sequences 417, 423 and 424 are shifted out of phase.

FIG. 4 also shows a time shifted control signal waveform 470 aligned in time with encoded signal representation 450. Control signal waveform 470 is identical to control signal waveform 430, except that control signal waveform 470 has been shifted forward in time by a time period of advancement TA indicated in FIG. 4 at 452. The time period of advancement TA, like the time period of delay TD, preferably constitutes about one half of the center wavelength of the carrier signal. Accordingly, the time period of advancement may be, for example, about 50 picoseconds.

Control signal waveform 470 can be used to control the phase shifting of data bar bit sequences 454, 456 and 458, while having no impact on data bar bit sequences 460, 462 and 464. Asserted data bar bit sequences 460, 462 and 464 will be referred to as regular data bar bit sequences. The interposed asserted data bar bit sequences 454, 456 and 458 will be referred to as alternate data bar bit sequences for the sole purpose of making subsequent reference to their interposed positions relative to the regular data bar bit sequences. Following completion of the phase shifting as described, regular data bar bit sequences 460, 462 and 464 remain in normal phase, and alternate data bar bit sequences 454, 456 and 458 are shifted out of phase.

The combined effect of an exemplary delay of control signal waveform 430 by a time period of 50 picoseconds and an exemplary advancement of control signal waveform 470 by a time period of 50 picoseconds is to shift the two control signal waveforms in time relative to each other by 100 picoseconds. Control signal waveform 430 can thus be used to generate control signal waveform 470 simply by shifting control signal waveform 430 relatively forward in time, compared with control signal waveform 470, by 100 picoseconds. Such use of the output signal from toggle flip flop circuit 122 to generate both of the needed control signal waveforms provides for efficient completion of these signal processing operations. Alternatively, an inverted form of control signal waveform 430 can be generated by the toggle flip flop circuit 122 and used as control signal waveform 470. The mutual symmetry embodied in the non return to zero coding of representation 310 and its inverted copy, representation 350, facilitates this use of the same control signal to execute the phase shifting of both representations 410 and 450 as shown in FIG. 4. Alternatively, control signal waveform 470 can be independently generated in the same manner as described above with regard to control signal waveform 430.

FIG. 5 shows the resulting failure protected pair 500 of alternate block phase inversion coded representations of the series of exemplary binary bits within source data stream 200. Alternate block phase inversion coded representation 520 is the result of generation of encoded signal representation 310 and processing of such encoded signal representation in the manner as shown in FIG. 4 by phase modulator 118. Alternate block phase inversion coded representation 540 is the result of generating of encoded signal representation 350 and processing of such encoded signal representation in the manner as shown in FIG. 4 by phase modulator 120.

Data bit sequences 521, 522 and 523 within the encoded representation 520 are aligned in time with and thus in phase with the source data stream 200. Data bit sequences 524, 525 and 526 have been shifted to be about 180° out of phase with the source data stream 200 as represented by the crosshatching of these sequences. Hence, the electromagnetic radiation waves within data bit sequences 524, 525 and 526 have been shifted to a point that is behind the phase of the electromagnetic radiation waves within data bit sequences 521, 522 and 523 by a time period equivalent to about one half of the center wavelength of the carrier signal. As the encoded representation 520 of the source data stream 200 is transmitted over a significant distance, the data bit sequences 521-526 spread out due to chromatic dispersion, as different wavelengths within the source data stream 200 travel at slightly different speeds. When the edges of adjacent asserted data bit sequences begin to overlap due to this pulse broadening, they destructively interfere as a result of the alternate phase shifting. This destructive interference advantageously delays the onset of constructive interference. Constructive interference between adjacent data bit sequences can convert an intended unasserted data bit into an asserted data bit, thus corrupting the source data stream 200. Hence, the alternate block phase inversion coding of encoded representation 520 provides protection for the source data stream 200 against chromatic dispersion. So long as the overlap of adjacent data bit sequences is of a magnitude less than about ⅓ of an asserted data bit, pulse broadening interference does not result in undue corruption of the original data bit sequence signal. The alternate block phase shifting does not require a magnitude of exactly 180°. Typically, the phase shifting can be selected within a range between about 135° and about 225°. Since perfect destructive interference is achieved at 180°, however, a close approximation to 180° is desirable.

Encoded signal representation 540 is an inverted version of the encoded signal representation 520. Asserted data bit sequences 521, 522, 523, 524, 525 and 526 within encoded signal representation 520 represent unasserted data bar bit sequences 541, 542, 543, 544, 545 and 546, respectively, within encoded signal representation 540. Unasserted data bit sequences 527, 528, 529, 530, 531 and 532 within encoded signal representation 520 represent asserted data bar bit sequences 547, 548, 549, 550, 551 and 552, respectively, within encoded signal representation 540. Conversion of the asserted and unasserted data bar bit sequences of representation 540 into unasserted and asserted data bit sequences, respectively, yields encoded signal representation 520. In a manner analogous to that described above with regard to encoded representation 520, data bar bit sequences 548, 550 and 552 of encoded signal representation 540 are in phase with the source data stream 200. However, as indicated by the crosshatching in FIG. 5, data bar bit sequences 547, 549 and 551 have been shifted to be about 180° out of phase with the source data stream 200. Hence, the alternate block phase inversion coding of encoded representation 540 also provides protection for the source data stream 200 against chromatic dispersion.

After completion of processing by phase modulator 118, alternate block phase inversion coded representation 520 is then output on waveguide 142 and input to optical network 104. Similarly, after completion of processing by phase modulator 120, alternate block phase inversion coded representation 540 is then output on waveguide 144 and input to optical network 104. Together, encoded representations 520 and 540 of the series of binary bits in exemplary source data stream 200 can facilitate failure protected transmission of the source data stream 200 from an origination point to a termination point. Encoded representations 520 and 540 can be transmitted by different paths, so that transmission failure as to one of the representations can be remedied by receipt of the other representation at the termination point. For example, if encoded representation 540 is needed to remedy a transmission failure as to representation 520, then representation 540 can be inverted by inverter 114 to constitute a copy of encoded representation 520.

Figure 6B:
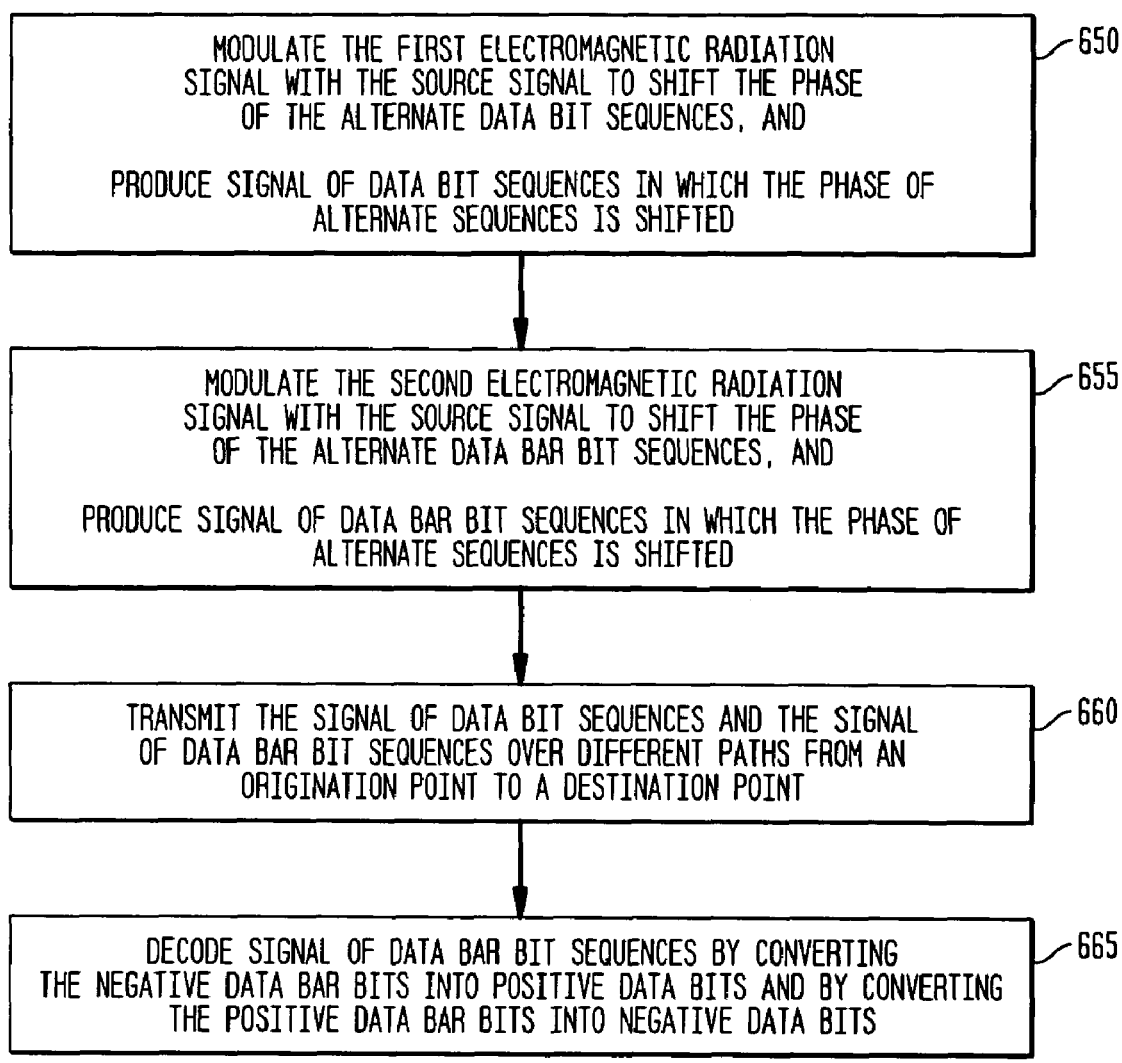

FIGS. 6A and 6B together show an exemplary method 600 according to the present invention for producing alternate block phase inversion coded representations 520 and 540 of a source data stream 200, which can if desired be carried out by using the exemplary apparatus 100 shown in FIG. 1. According to the method 600, first and second beams of continuous wave electromagnetic radiation are provided at step 610, for example using two coupled coherent continuous wave lasers. If desired, a single continuous wave source of electromagnetic radiation such as continuous wave laser 108 can be provided at step 605, the continuous laser wave of which is then suitably split using exemplary optical 1×2 splitter 110 in order to yield the first and second beams needed at step 610. At step 615, a series of binary bits is provided in the form of source data stream 200 by exemplary transmitter 102 to be transmitted from an origination point to a termination point.

In step 620, the first and second beams of electromagnetic radiation are modulated with the source signal provided at step 615, in order to generate first and second electromagnetic radiation signals at steps 630 and 640, respectively. The first and second electromagnetic radiation signals produced at steps 630 and 640 are shown in FIG. 3 as encoded signal representations 310 and 350, respectively. Step 620 is carried out in such a manner that whenever the source data stream 200 shown in FIG. 2 contains asserted data bits such as exemplary asserted data bit 210, the first electromagnetic radiation signal shown as encoded representation 310 contains asserted data bits such as exemplary asserted data bit 314, and the second electromagnetic radiation signal shown as encoded representation 350 contains unasserted data bar bits such as exemplary unasserted data bar bit 356. Further, whenever the source data stream 200 contains unasserted data bits such as exemplary unasserted data bit 220, the first electromagnetic radiation signal shown as encoded representation 310 contains unasserted data bits such as exemplary unasserted data bit 316, and the second electromagnetic radiation signal shown as encoded representation 350 contains asserted data bar bits such as exemplary asserted data bar bit 352.

Encoded representation 350 constitutes the inverse of encoded representation 310. Therefore, step 620 can be considered as requiring the source data stream 200 to at all times be represented either by asserted data bits in encoded representation 310 or by asserted data bar bits in encoded representation 350, but never simultaneously by both. Hence, step 620 calls for switching a continuous wave between encoded representation 310 and inverted encoded representation 350 as modulated by the source data stream 200. Step 620 efficiently generates inverted encoded representation 350, since inverted encoded representation 350 is the inverse of encoded representation 310. The electromagnetic radiation that would be discarded if only encoded representation 310 were being generated, is instead employed to generate inverted encoded representation 350. The non return to zero coding in representations 310 and 350 is particularly suitable for generation by step 620, as this coding format permits direct processing of an inverted copy of the coded signal by the switching process, without any further signal conversion or other processing being required. Step 620 can be carried out by any hardware or software suitable to carry out this switching process. In general, direct modulation of the source data stream 200 leads to perturbations in the leading and falling edges of data sequences that is referred to as "chirp". Indirect, external modulation of the source data stream 200 can be carried out to minimize such perturbations.

If desired, step 620 can be carried out as specified at step 625, by modulating the relative phases of the first and second beams with the source signal and then directing the two resulting output signals through a propagation medium to facilitate their mutual interference. Step 620 can thus be carried out by using the exemplary external modulator 116. Optical to electrical converter 112 provides the needed control signal, modulated by the source data stream 200. Constructive and destructive interference between the first and second beams can thus be modulated by the source signal so that asserted data bits are generated within encoded representation 310 and asserted data bar bits are generated within encoded representation 350.

Steps 620 and 625 result in generation at step 630 of encoded representation 310 constituting a first electromagnetic radiation signal. Step 630 as shown in FIG. 6 summarizes features of encoded representation 310. Encoded representation 310 is constituted by binary data including asserted data bits and unasserted data bits. The asserted data bits are coded in non return to zero format. Mutually adjacent asserted data bits are conjoined as exemplified by asserted data bit sequence 312. The term "conjoined" as used herein means that the mutually adjacent asserted data bits are directly joined together into a unitary asserted data bit sequence having a length equivalent to the cumulative data bit lengths that are so joined together. Encoded representation 310 is considered at this stage to include regular asserted data bit sequences interposed by alternate asserted data bit sequences, for the sole purpose of facilitating subsequent reference to their interposed positions relative to the regular asserted data bit sequences. Encoded representation 310 is output by exemplary external modulator 116 on waveguide 136 and input to phase modulator 118.

Steps 620 and 625 also result in generation at step 640 of encoded representation 350 constituting a second electromagnetic radiation signal. Step 640 as shown in FIG. 6 summarizes features of encoded representation 350. Encoded representation 350 is constituted by binary data including asserted data bar bits and unasserted data bar bits. The asserted data bar bits are coded in non return to zero format. Mutually adjacent asserted data bar bits are conjoined as exemplified by asserted data bar bit sequence 358. The asserted data bar bits represent the unasserted data bits. The unasserted data bar bits represent the asserted data bits. Encoded representation 350 is considered at this stage to include regular asserted data bar bit sequences interposed by alternate asserted data bar bit sequences, for the sole purpose of facilitating subsequent reference to their interposed positions relative to the regular asserted data bar bit sequences. Encoded representation 350 is output by exemplary external modulator 116 on waveguide 138 and input to phase modulator 120.

If desired, in steps 650 and 655 the first and second electromagnetic radiation signals, respectively, can be modulated with the source signal to shift the phase of alternate data bit and data bar bit sequences. These steps can be carried out in the manner as discussed in detail above in connection with FIG. 4. If desired, phase modulators 118 and 120, controlled by toggle flip flop circuit 122 itself modulated by the source data stream 200, can be used to carry out these steps. Step 650 yields a data bit sequence signal in the format of representation 520. Step 655 yields a data bar bit sequence signal in the format of representation 540.

At step 660, the data bit sequence signal in the format of representation 520 and the data bar bit sequence signal in the format of representation 540 are transmitted over different paths from an origination point to a termination point. For example, representations 520 and 540 can be input by waveguides 142 and 144 onto diverse routes through exemplary optical network 104. The alternate block phase inversion coding provides each of the two signals with resistance to chromatic dispersion. The duality of the signals as representing the same information and transmitted over different paths provides protection against the failure of delivery of either one of the signals to the termination point.

At step 665, the data bar bit sequence signal in the format of representation 540 can be decoded by inversion if desired, to generate a data bit sequence signal in the format of representation 520. This step can be carried out by using exemplary inverter 114 shown in FIG. 1.

Figure 7:
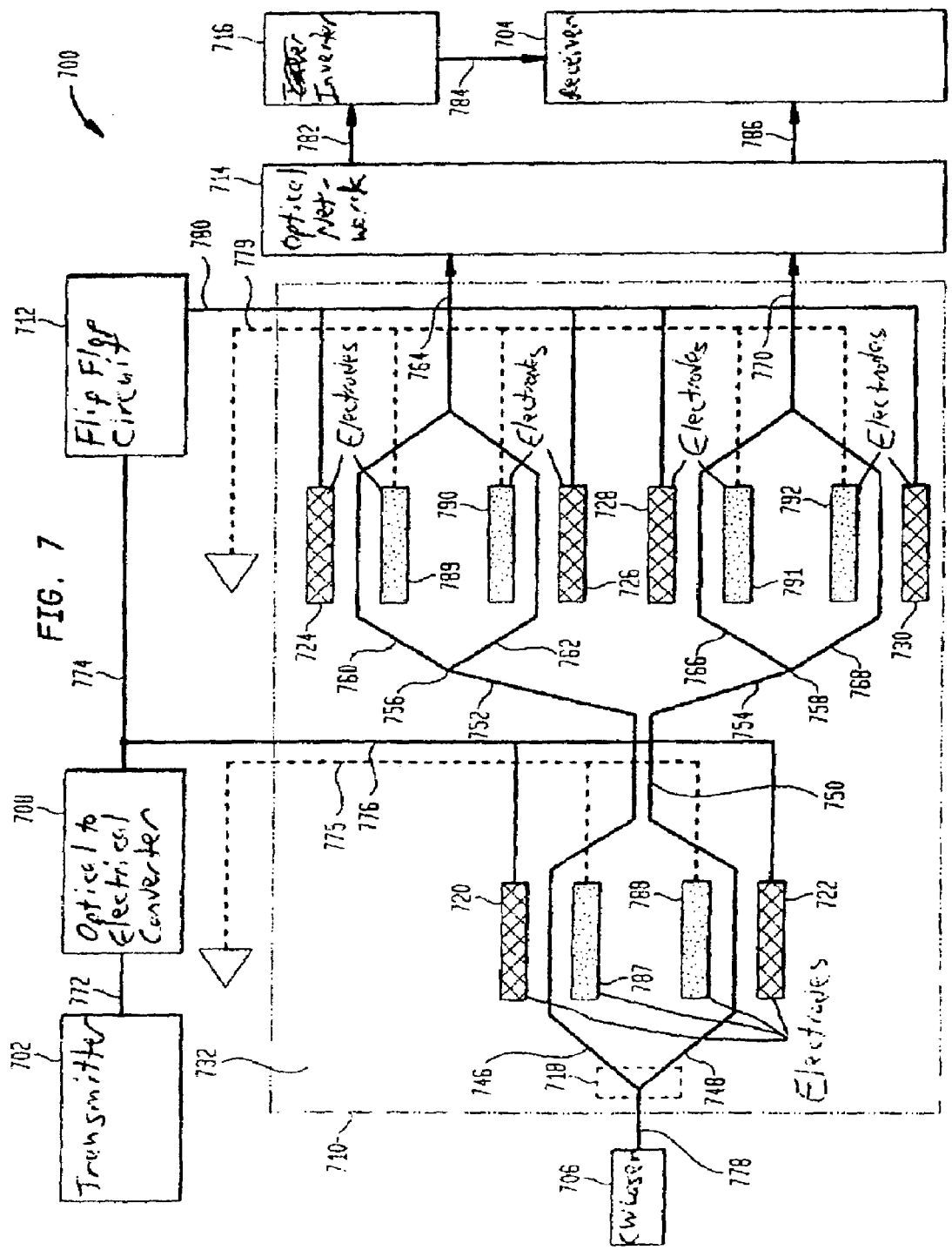
FIG. 7 shows an additional exemplary embodiment of an apparatus for producing a chromatic dispersion resistant electromagnetic radiation signal protected against a signal transmission failure in accordance with the present invention.

FIG. 7 shows another exemplary embodiment of a suitable apparatus 700 that can be used to produce a chromatic dispersion resistant electromagnetic radiation signal protected against a signal transmission failure in accordance with the present invention.

The apparatus 700 includes a transmitter 702 from which a source signal originates and which needs to be transmitted to a receiver 704. The apparatus further includes a continuous wave laser 706, an optical to electrical converter 708, an integrated external modulator with phase modulators 710, a flip flop circuit 712, an optical network 714, and an inverter 716. The integrated external modulator with phase modulators 710 comprises an optical 1×2 splitter 718. The integrated external modulator with phase modulators 710 further comprises electrodes 720, 722, 724, 726, 728, 730, 787, 788, 789, 790, 791 and 792 located on a dielectric substrate 732. Electrodes 720, 722, 787 and 788 together form an external modulator. Waveguide 746 longitudinally passes nearby and between electrodes 720 and 787. Waveguide 748 longitudinally passes nearby and between electrodes 722 and 788. Waveguides 746 and 748 then pass in mutual proximity to form a coupler 750, and then diverge into waveguides 752 and 754, respectively. Electrodes 724, 726, 789 and 790 together form a first phase modulator generally indicated at 756, and electrodes 728, 730, 791 and 792 together form a second phase modulator generally indicated at 758. Waveguide 752 branches into two separate waveguides 760 and 762. Waveguide 760 longitudinally passes between nearby electrodes 724 and 789. Waveguide 762 longitudinally passes between nearby electrodes 726 and 790. Waveguides 760 and 762 then rejoin to form waveguide 764, forming phase modulator 756. Waveguide 754 branches into two separate waveguides 766 and 768. Waveguide 766 longitudinally passes between nearby electrodes 728 and 791. Waveguide 768 longitudinally passes between nearby electrodes 730 and 792. Waveguides 766 and 768 then rejoin to form waveguide 770, forming phase modulator 758.

The transmitter 702 transmits an optical source signal on waveguide 772 to optical to electrical converter 708. Optical to electrical converter 708 outputs an electrical signal on conductor 774 which is input into toggle flip flop circuit 712. Optical to electrical converter 708 also outputs an electrical signal on conductor 776 which is input into electrodes 720 and 722 in the integrated external modulator with phase modulators 710. Electrodes 787 and 788 are suitably grounded by conductor 775. Continuous wave laser 706 outputs a continuous optical wave on waveguide 778 to optical 1×2 splitter 718, which is included in the integrated external modulator with phase modulators 710. Optical 1×2 splitter 718 outputs continuous optical waves on waveguides 746 and 748. The optical wave on waveguide 746 is conveyed longitudinally between electrodes 720 and 787, through coupler 750, and then on waveguide 752 to phase modulator 756. The optical wave on waveguide 748 is conveyed longitudinally between electrodes 722 and 788, through coupler 750, and thereafter on waveguide 754 to phase modulator 758. The optical signal on waveguide 752 is then split into two identical signals on waveguides 760 and 762. Waveguide 760 carries the optical signal between nearby electrodes 724 and 789. Waveguide 762 carries the optical signal between nearby electrodes 726 and 790. Waveguides 760 and 762 then recombine the optical signals at waveguide 764, forming phase modulator 756. The optical signal is then output into optical network 714. The optical signal on waveguide 754 is split into two identical signals on waveguides 766 and 768. Waveguide 766 carries the optical signal longitudinally between nearby electrodes 728 and 791. Waveguide 768 carries the optical signal longitudinally between nearby electrodes 730 and 792. Waveguides 766 and 768 then recombine the optical signals at waveguide 770, forming phase modulator 758. The optical signal is then output into optical network 714. Toggle flip flop circuit 712 outputs an electrical signal on conductor 780 which is input to electrodes 724, 726, 728 and 730. Electrodes 789, 790, 791 and 792 are suitably grounded by conductor 779. After passing through the optical network 714, the optical signal received from waveguide 764 is input on waveguide 782 to inverter 716, and then on waveguide 784 to receiver 704. After passing through the optical network 714, the optical signal received from waveguide 770 is input on waveguide 786 to receiver 704.

In operation of the apparatus 700, continuous wave laser 706 executes step 605 by generating a continuous wave of electromagnetic radiation on waveguide 778 which is directed into integrated external modulator with phase modulators 710. The output power of the continuous wave laser 706 is adjusted to provide electromagnetic radiation of adequate intensity to produce two continuous electromagnetic radiation waves each having an appropriate intensity. The 1×2 splitter generally indicated at 718 within the integrated external modulator with phase modulators 710 then produces two identical continuous waves of electromagnetic radiation on waveguides 746 and 748, executing step 610.

Integrated external modulator with phase modulators 710 is provided with electrodes 720 and 787 positioned as discussed above with respect to waveguide 746, and with electrodes 722 and 788 positioned as discussed above with respect to waveguide 748, constituting a 1×2 dual output Mach-Zehnder interferometer. In the exemplary embodiment an x-cut design is used, as particularly useful for signals carried on an electromagnetic radiation wave having a bit rate of 10 Gb/sec or less. Alternatively, a z-cut design can be used, as particularly useful for signals carried on an electromagnetic radiation wave having a bit rate of at least 10 gigabytes per second (Gb/sec). Further alternative external modulator designs can be substituted.

A source signal is emitted from the transmitter 702 on waveguide 772 and directed into optical to electrical converter 708. The optical to electrical converter 708 converts the source signal on waveguide 772 from an optical form into an electrical form. The resulting electrical signal is then emitted from the optical to electrical converter 708 on conductor 774 and is directed by conductor 776 to electrodes 720 and 722, executing step 615.

The continuous waves of electromagnetic radiation on waveguides 746 and 748 are directed past electrodes 720 and 722 carrying an electrical signal modulated by the source signal. Electrodes 720 and 722 accordingly emit electromagnetic fields modulated by the source signal emitted by transmitter 702, which modulate the phase of the waves of electromagnetic radiation on waveguides 746 and 748. Since electrodes 720 and 722 are on opposite sides of the waveguides from grounded electrodes 787 and 788, the field effect of the source signal on the phases of the waves of electromagnetic radiation on waveguides 746 and 748 is of opposite polarities. Consequently, the phases of the waves of electromagnetic radiation on waveguides 746 and 748 are simultaneously changed in opposite directions. The relative phases of the waves of electromagnetic radiation on waveguides 746 and 748 can be modulated between an applied voltage (V) of $V\pi/2$ and $-V\pi/2$ in order to generate constructive and destructive interference between the waves of electromagnetic radiation, thus executing step 620 and initiating step 625.

Waveguides 746 and 748 then direct the waves of electromagnetic radiation as two separate output signals into close mutual proximity through the coupler 750, where they constructively and destructively interfere as modulated by the source signal. The coupler is an effective propagation medium to facilitate mutual interference of the waves of electromagnetic radiation in completion of step 625. This interference results in emission of a data bit sequence signal 310 in execution of step 630 which is then directed by waveguide 752 into phase modulator 756, and emission of a data bar bit sequence signal 350 in execution of step 640 which is then directed by waveguide 754 into phase modulator 758.

The electrical signal on conductor 774 is also used to control phase modulators 756 and 758. The electrical signal is directed into toggle flip flop circuit 712, which senses transitions in the source signal from asserted data bits to unasserted data bits and operates in the same manner as previously discussed in connection with FIG. 4. The toggle flip flop circuit 712 can be provided, for example, by a Fraunhofer IAF ASD201M static divider. The voltage emitted by toggle flip flop circuit 712 is directed by conductor 780 to control phase modulator 756 and phase modulator 758. The signal emitted by toggle flip flop circuit 712 is advanced as directed to phase modulator 758 and delayed as directed to phase modulator 756 in the same manner as discussed above in connection with FIG. 4. The same toggle flip flop circuit 712 can be used to control both phase modulator 756 and phase modulator 758. Alternatively, if desired, separate toggle flip flop circuits can be provided to control each of the phase modulators 756 and 758.

Phase modulator 756 is provided with electrodes 724 and 726, and phase modulator 758 is provided with electrodes 728 and 730. Electrodes 724, 726, 728 and 730 are supplied with a control signal generated by toggle flip flop circuit 712 and carried by conductor 780. Electrodes 724, 726, 728 and 730 accordingly emit electromagnetic fields modulated by the source signal emitted by transmitter 702.

When a relatively high voltage as discussed above in connection with FIG. 4 is applied to electrodes 728 and 730 of phase modulator 758, data bit sequences within data bit sequence signal 310 remain in phase with source signal. When a relatively low voltage is applied to such electrodes of phase modulator 758, data bit sequences within data bit sequence signal 310 are shifted about 180° out of phase with the source signal. When a relatively high voltage as discussed above in connection with FIG. 4 is applied to electrodes 724 and 726 of phase modulator 756, data bar bit sequences within data bar bit sequence signal 350 remain in phase with source signal. When a relatively low voltage is applied to such electrodes of phase modulator 756, data bar bit sequences within data bar bit sequence signal 350 are shifted about 180° out of phase with the source signal.

Phase modulator 758 emits an alternate block phase inverted data bit signal on waveguide 770 in execution of step 650 in the form of encoded signal representation 520 shown in FIG. 5. Phase modulator 756 emits an alternate block phase inverted data bar bit signal on waveguide 764 in execution of step 655 in the form of encoded signal representation 540 shown in FIG. 5.

The alternate block phase inverted data bit signal and the alternate block phase inverted data bar bit signal are then directed through optical network 714 to receiver 704, in execution of step 660. The signals can be directed on different paths through the optical network 714 in order to provide failure protection for the source signal.

The alternate block phase inverted data bit signal in the form of encoded signal representation 520 and alternate block phase inverted data bar bit signal in the form of encoded signal representation 540 are conventionally processed by receiver 704. For example, signals 520 and 540 may be converted from an optical form into an electrical form by an optical to electrical converter. Since encoded signal representation 540 is in an inverted format, it can be processed by inverter 716 in execution of step 665.

In an alternative embodiment according to the present invention, the phase modulators 756 and 758 and toggle flip flop circuit 712 can be omitted. In such a case, waveguides 754 and 752 emit a non return to zero data bit sequence signal and a non return to zero data bar bit sequence signal, respectively. These signals are then transmitted through the network 714. In a further alternative embodiment according to the present invention, electrodes 787, 788, 789, 790, 791 and 792 can carry an electrical signal modulated by the source signal, and electrodes 720, 722, 724, 726, 728 and 730 can be suitably grounded.

The apparatus shown in FIGS. 1 and 7 and discussed above are non limiting exemplary embodiments suitable for use in accordance with the present invention. FIGS. 1 and 7, for example, each show a single transmitter and a single receiver. Telecommunications networks typically include a plurality of transmitters and receivers, facilitating two way signal transmission between any two network locations. The methods and apparatus according to the present invention have been discussed in connection with providing one inverted copy of a source signal as protection against one signal transmission failure. However, if desired, further direct and inverted copies of a source signal could also be provided in the same manner as described.

Other designs for external modulators and phase modulators capable of processing electromagnetic radiation waves to generate modulated phase changes and modulated constructive and destructive interference can also be used. Suitable alternative devices may include devices from the classes known as electro absorption and electro optic modulators, the former class including devices composed of materials used in semiconductor lasers, and the latter class comprising materials whose refractive index can be altered by an applied electric field. Internal modulators not subject to signal distortions such as chirping can if available be used. The co pending and co owned Korotky et al. U.S. patent application Ser. No. 10/245,029, filed on Sep. 17, 2002, entitled "Provisionable Keep-Alive Signal For Physical-Layer Protection of an Optical Network" (Korotky et al.) discloses external modulators having integral splitters, that are suitable for use in accordance with the present invention. Phase modulators as shown in FIGS. 1 and 7 herein can be added to such external modulators. The entirety of the Korotky et al. application, with particular attention to FIGS. 4 and 7 and the accompanying discussion, is incorporated by reference herein in its entirety. Further background information regarding Mach-Zehnder devices is provided in Wooten, Ed L. et al., "A Review of Lithium Niobate Modulators for Fiber-Optic Communications Systems," *IEEE Journal of Selected Topics in Quantum Electronics*, Vol. 6, No. 1, pp. 69-82, January/February 2000, which is hereby incorporated by reference herein in its entirety. The present invention may be implemented using Mach-Zehnder modulators of the lithium niobate type, although other suitable types of Mach-Zehnder modulators and suitable modulators other than Mach-Zehnder modulators may also be used.

In order to demonstrate the quality characteristics of signals with and without phase inversion prepared according to the present invention, a test apparatus was constructed. The test apparatus was consistent with FIG. 1 as described above, except that phase modulator 120, inverter 114, and network 104 were omitted.

Figure 8:
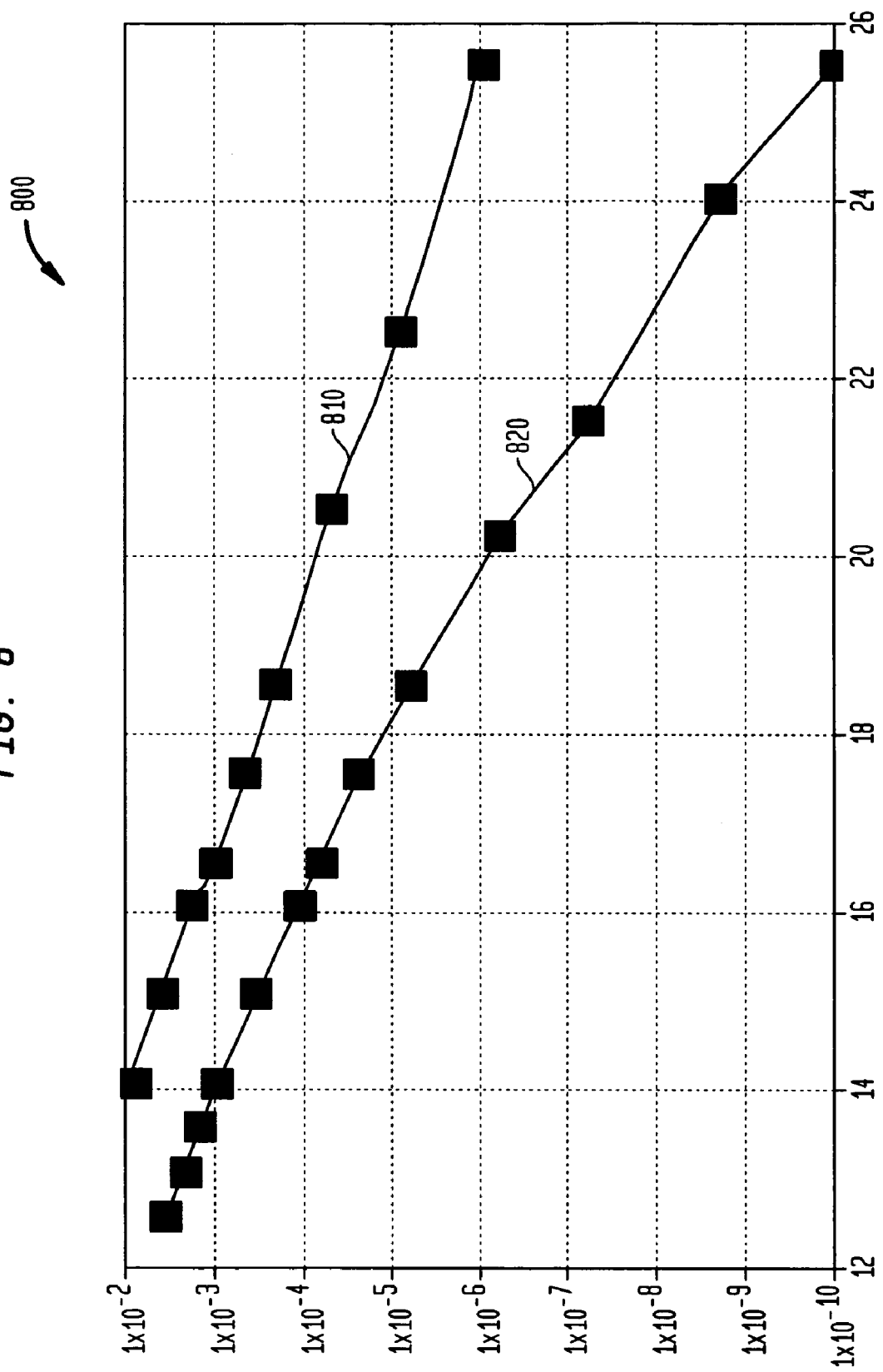
FIG. 8 shows a plot of bit error rate versus the optical signal to noise ratio required to transmit a signal according to the present invention over a distance of 80 kilometers.

FIG. 8 shows a graph 800 plotting on the vertical axis, bit error rate (BER), and plotting on the horizontal axis the resulting optical signal to noise ratio (OSNR) required in decibels (dB) in order to transmit the signal over a distance of 80 kilometers (km) on standard single mode optical fiber (SSMF). Accordingly, FIG. 8 represents the impact of varying the BER while holding the transmission distance constant. The bit error rate is a ratio of bit errors as a fraction of total bits and is a measure of signal quality. In the experiments a $(2^{31}-1)$ bit pseudorandom bit sequence generator was employed. Curve 810 plots measured data for a signal without phase shifting. Curve 820 plots measured data for an alternate block phase inverted signal, in which alternate data bit sequences were shifted about 180° out of phase. Curve 810 shows that the experimental apparatus without alternate block phase shifting effectively coded the signal, with an OSNR of about 16.4 dB required to achieve a BER of about $1 \times 10^{-3}$. Curve 820 shows that the experimental apparatus with alternate block phase shifting also effectively coded the alternate block phase inversion signal, with an OSNR of only about 14 dB required to achieve a BER of about $1\times10^{-3}$. Since 3 dB approximately represents a doubling in signal strength, the disparity between curves 810 and 820 confirms the substantial improvement in signal quality resulting from generation of the alternate block phase inversion signal format according to the present invention.

Figure 9:
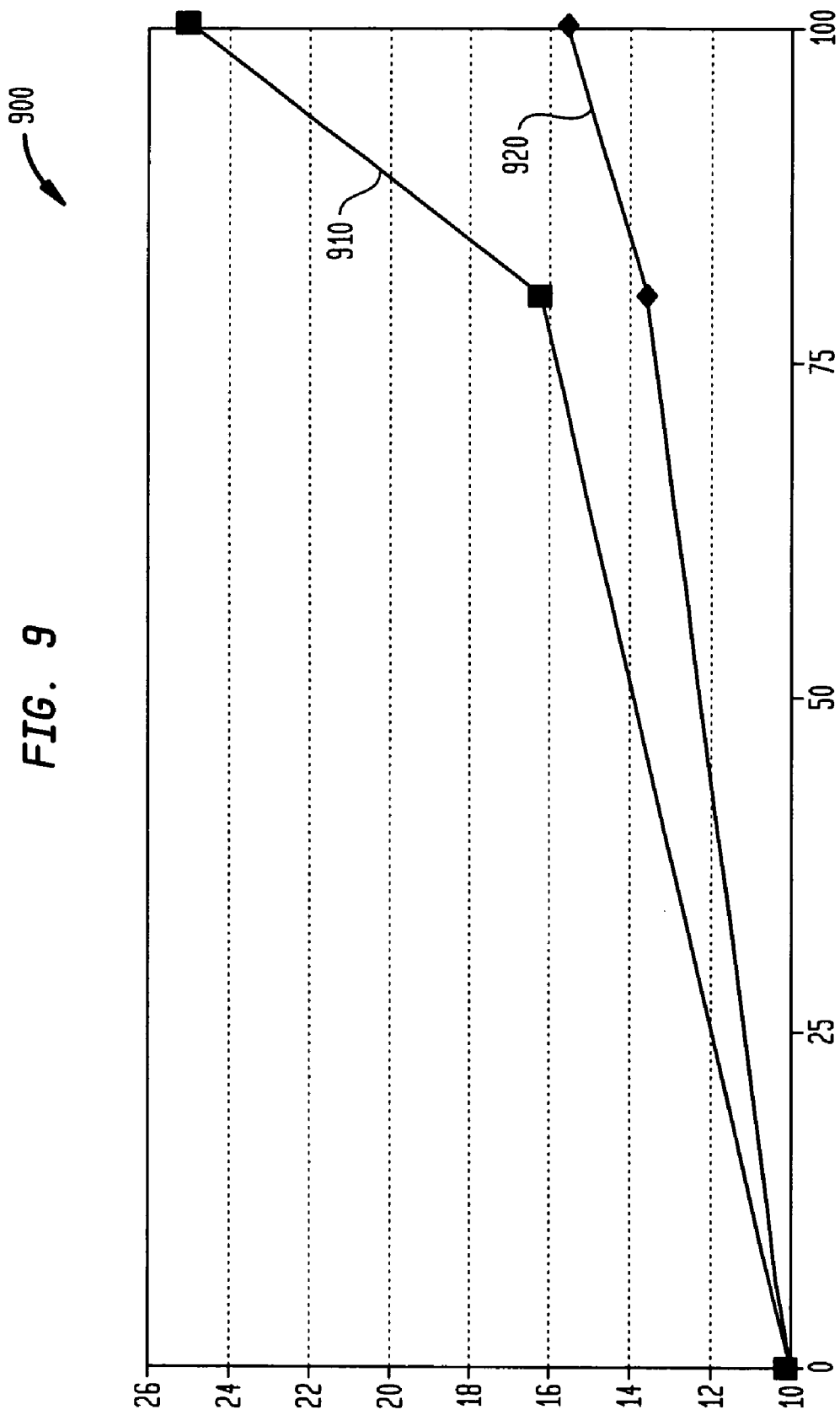
FIG. 9 shows a plot of optical signal to noise ratio versus distance traveled by a signal according to the present invention.

FIG. 9 shows a graph 900 that plots the OSNR in dB on the vertical axis, and the distance traveled in km by the signal over SSMF on the horizontal axis, with a fixed BER of $1\times10^{-3}$. Accordingly, FIG. 9 represents the impact on OSNR of varying the transmission distance while holding the BER constant. Curve 910 again plots measured data for a signal without phase shifting. Curve 920 plots measured data for an alternate block phase inverted signal, in which alternate data bit sequences were shifted about 180° out of phase. At a transmission distance of about 80 km, curves 910 and 920 indicate a required OSNR of about 16 dB and about 13.5 dB, respectively. Both of these OSNR's are acceptable, but the performance of the alternate block phase inverted signal is clearly superior.

In the above embodiments, the laser, external modulator, toggle flip flop circuit, and other apparatus elements have been depicted in separate boxes. In FIG. 7, the external modulator and phase modulators are integrated together. Depending on the implementation, different parts of the components for use in accordance with the present invention may be implemented in the same or different housings, circuit packs, circuit cards, multi-chip modules, substrates, or mixed-mode application specific integrated circuits, potentially along with other circuitry. In one possible implementation, the laser and the external modulator are integrated together onto the same substrate.

The present invention has been described broadly with respect to networks operated using electromagnetic radiation such as light at a center wavelength of, for example, about 1550 nm. However, it should be understood by one skilled in the art that the present invention is equally applicable to related systems, subsystems and apparatus, including synchronous optical networks (SONET), add-drop multiplexers, and optical internet-protocol (IP) routers.

The present invention has further been described with respect to protection of a source signal. The apparatus and methods according to the present invention are also applicable to bridging applications in which a plurality of representations of a source signal are transmitted to a plurality of destinations.

While the present invention has been disclosed in the context of various aspects of presently preferred embodiments, it will be recognized that the invention may be suitably applied to other environments consistent with the claims which follow.

We claim:

1. An apparatus for creating alternate block phase inversion coded representations of an optical communication signal, the apparatus comprising:

a modulator adapted to modulate a first and a second beam of continuous wave electromagnetic radiation with a source signal so that the first and second beams combine to produce streams of asserted and unasserted data bits, to assemble modulated portions of said first and second beams into a first electromagnetic radiation signal of interposed regular and alternate data bit sequences comprising blocks of asserted non return to zero coded data bits, each of said data bit sequences being interposed by blocks of unasserted data bits, and to assemble modulated portions of said first and second beams into a second electromagnetic radiation signal of interposed regular and alternate data bar bit sequences comprising blocks of asserted non return to zero coded data bar bits representing said unasserted data bits, each of said data bar bit sequences being interposed by blocks of unasserted data bar bits representing said asserted data bits; and means for modulating said first and second electromagnetic radiation signal using information provided by said source signal, to shift the phase of said alternate data bit sequences and said alternate data bar bit sequences.

2. The apparatus of claim 1 wherein the means for modulating said first and second electromagnetic radiation signals employs a control signal time shifted for at least one of the first and second electromagnetic radiation signals.

3. The apparatus of claim 1, in which said modulator is an external modulator that is adapted to modulate the relative phases of said first and second beams of continuous wave electromagnetic radiation with said source signal and to then subject said first and second beams of electromagnetic radiation to mutual interference.

4. The apparatus of claim 1 comprising means adapted to decode said second electromagnetic radiation signal into a copy of said first electromagnetic radiation signal, by converting said unasserted data bar bits into asserted data bits and by converting said asserted data bar bits into unasserted data bits.

5. The apparatus of claim 1 in which said modulator is adapted to modulate first and second beams of continuous wave light.

6. The apparatus of claim 1 further comprising means for transmitting said first and second electromagnetic radiation signals to a single destination, providing protection for said source signal against a signal transmission failure.

7. The apparatus of claim 1 further comprising means for transmitting said first and second electromagnetic radiation signals to two destinations, bridging said source signal to said two destinations.

8. The apparatus of claim 1 further comprising:

a transmitter for providing said source signal;

a receiver; and an optical network having a first path and a second path, each of said paths being in communication with said transmitter and said receiver;

said apparatus adapted to transmit said first electromagnetic radiation signal from said transmitter to said receiver on said first path and to transmit said second electromagnetic radiation signal from said transmitter to said receiver on said second path.

9. The apparatus of claim 1 further comprising:

a transmitter for providing said source signal;

first and second receivers; and an optical network having a first path and a second path, said first path being in communication with said transmitter and said first receiver, and said second path being in communication with said transmitter and said second receiver;

said apparatus adapted to transmit said first electromagnetic radiation signal from said transmitter to said first receiver on said first path and to transmit said second electromagnetic radiation signal from said transmitter to said second receiver on said second path.

10. The apparatus of claim 1 in which said means for modulating said first and second electromagnetic radiation signals comprises first and second phase modulators.

11. The apparatus of claim 10 in which the means for modulating is adapted to simultaneously shift the phases of said alternate data bit sequences and of said alternate data bar bit sequences by directing modulation of said first and second electromagnetic radiation signals using the information provided by said source signal.

12. The apparatus of claim 3 in which said external modulator comprises a dual output intensity modulator.

13. The apparatus of claim 11 in which said means adapted to simultaneously shift the phases of said alternate data bit sequences and of said alternate data bar bit sequences comprises a toggle flip flop circuit.

14. A method of creating alternate block phase inversion coded representations of an optical communication signal, comprising:
   modulating a first and a second beam of continuous wave electromagnetic radiation with a source signal so that the first and second beams combine to generate streams of asserted and unasserted data non return to zero coded bits;
   generating a first electromagnetic radiation signal of interposed regular and alternate data bit sequences comprising blocks of the asserted non return to zero coded data bits, each of said data bit sequences being interposed by blocks of the unasserted data bits;
   generating a second electromagnetic radiation signal of interposed regular and alternate data bar bit sequences comprising blocks of asserted non return to zero coded data bar bits representing said unasserted data bits, each of said data bar bit sequences being interposed by blocks of unasserted data bar bits representing said asserted data bits;
   modulating said first electromagnetic radiation signal using information provided by said source signal to shift the phase of said alternate data bit sequences; and
   modulating said second electromagnetic radiation signal using information provided by said source signal to shift the phase of said alternate data bar bit sequences.

15. The method of claim 14 further comprising: utilizing a common control signal time shifted for at least one of the modulating steps in said modulating said first and second electromagnetic radiation signal.

16. The method of claim 14 in which said step of modulating comprises modulating the relative phases of said first and second beams of continuous wave electromagnetic radiation with said source signal to produce first and second output signals, and then launching said first and second output signals into a propagation medium such that said first and second output signals mutually interfere, producing said first and second electromagnetic radiation signals.

17. The method of claim 14 comprising the further step of decoding said second electromagnetic radiation signal into a copy of said first electromagnetic radiation signal by converting said unasserted data bar bits into asserted data bits and by converting said asserted data bar bits into unasserted data bits.

18. The method of claim 14 comprising the further step of transmitting said first electromagnetic radiation signal and said second electromagnetic radiation signal from an origination point to a termination point over two different paths to provide protection for said source signal against a signal transmission failure.

19. The method of claim 14 comprising the further step of transmitting said first electromagnetic radiation signal and said second electromagnetic radiation signal from an origination point to two different termination points over two different paths to provide bridging of said source signal.

20. The method of claim 14 in which each of said first electromagnetic radiation signal and said second electromagnetic radiation signal is an optical signal.

21. The method of claim 14 in which said steps of modulating said first and second electromagnetic radiation signal with said information provided by said source signal comprise simultaneously shifting the phases of said alternate data bit sequences and said alternate data bar bit sequences.

22. The method of claim 14 comprising the further step of transmitting said first and second electromagnetic radiation signals over a distance sufficient to generate chromatic dispersion resulting in some overlap between said data bit sequences and in some overlap between said data bar bit sequences, producing destructive interference.

23. The method of claim 14 in which said step of modulating said first and second electromagnetic radiation signals with said source signal comprises shifting said phases by about 180°.

24. The method of claim 16 in which said step of modulating comprises controlling such mutual interference to selectively and simultaneously create said asserted data bits and said unasserted data bar bits.

* * * * *